United States Patent

[11] 3,537,486

| [72] | Inventor | William B. Hullhorst<br>Granville, Ohio |
|---|---|---|
| [21] | Appl. No. | 753,452 |
| [22] | Filed | Aug. 19, 1968 |
| [45] | Patented | Nov. 3, 1970 |
| [73] | Assignee | Owens-Corning Fiberglas Corporation<br>a corporation of Delaware |

[54] PIPE INSULATION ASSEMBLY
15 Claims, 4 Drawing Figs.

[52] U.S. Cl.................................................. 138/147,
138/178
[51] Int. Cl.................................................. F16l 9/22
[50] Field of Search........................................ 138/140,
147, 148, 149, 177, 178; 24/255, 256, 257

[56] References Cited

UNITED STATES PATENTS

| 213,558 | 3/1879 | Field et al. ..................... | 138/178 |
| 2,709,094 | 5/1955 | Polanski ....................... | 24/256 |
| 3,058,860 | 10/1962 | Rutter .......................... | 138/147 |
| 3,157,204 | 11/1964 | Phillips......................... | 138/147X |

Primary Examiner—Henry S. Jaudon
Attorneys—Staelin & Overman and Richard D. Emch ABSTRACT: A pipe insulation assembly for enclosing a conduit. The assembly includes two semiannular cylindrical sections. Preferably, the sections are formed of resin bonded fibrous glass wool. A pair of spring steel clips extend circumferentially around the sections, lying across only one of the two mating edges of the sections. The clips bias the sections toward a closed position. A layer of flexible sheet material surrounds the exterior surface of the two sections.

Patented Nov. 3, 1970  3,537,486
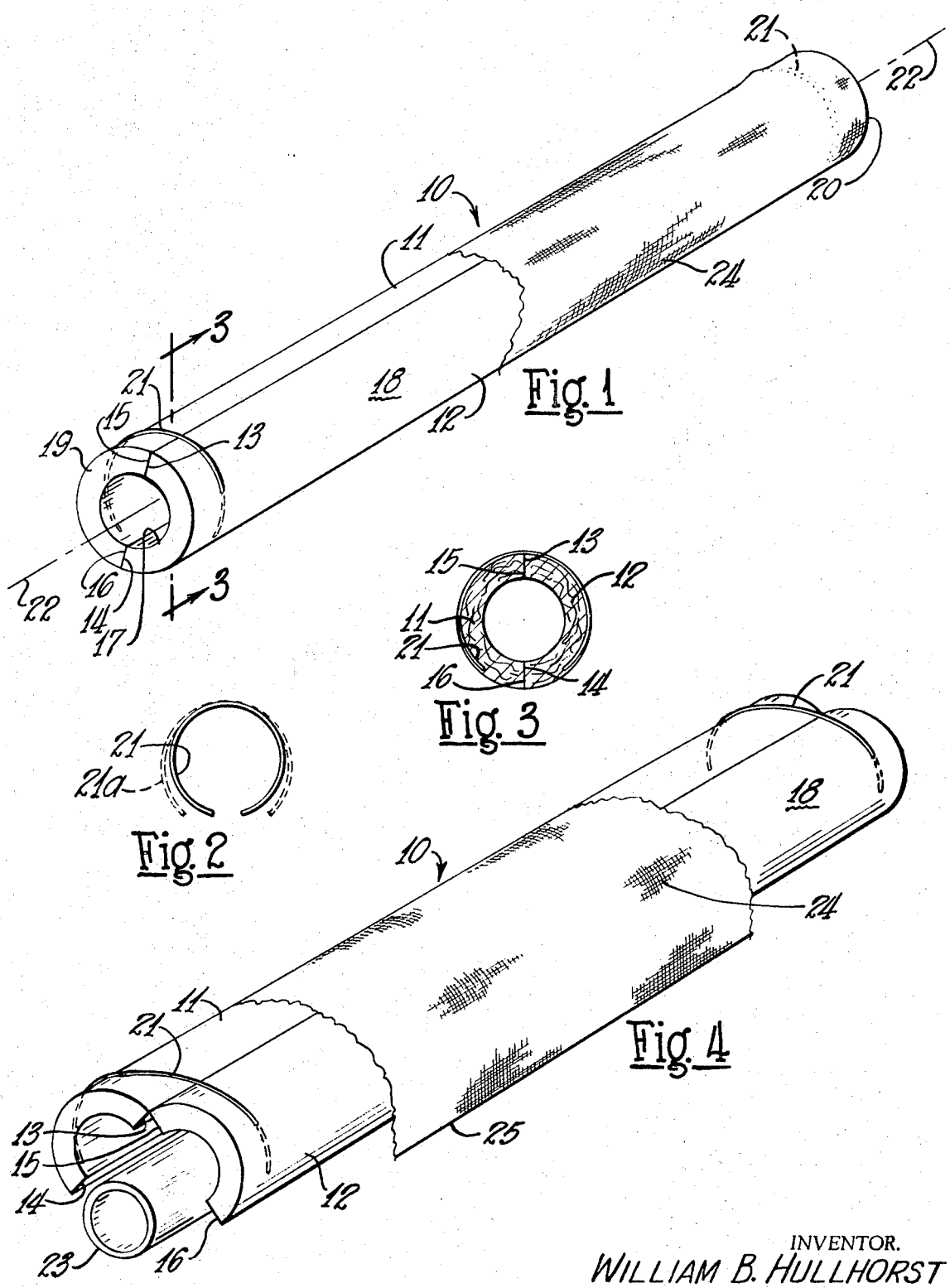
INVENTOR.
WILLIAM B. HULLHORST
BY
Staelin + Overman
ATTORNEYS

PIPE INSULATION ASSEMBLY

BACKGROUND OF THE INVENTION

Many attempts have been made in the past to provide sectional pipe insulation which is used to insulate conduits, for examples, hot and cold piping. In addition to good thermal efficiency, sectional pipe insulation must present a pleasing exterior appearance. Because of labor costs, sectional pipe insulation must also be relatively easy and fast to install.

SUMMARY OF THE INVENTION

The present invention is an improved pipe insulation assembly which is easily installed.

The insulation assembly, according to the present invention, has two semiannular elongated sections which snap into place around the conduit or pipe to be insulated. Preferably, the sections are formed of resin bonded fibrous glass wool. At least two resilient clips extend circumferentially around the sections providing the snap action. An outer cover of flexible sheet material or jacketing is adhered to the exterior surface of the sections.

It is the primary object of the present invention to provide an improved pipe insulation assembly.

BRIEF DESCRIPTION OF THE DRAWING

FIG. 1 is a perspective view, with parts broken away, of a pipe insulation assembly according to the present invention;

FIG. 2 is an end view of a clip constructed according to the present invention and indicating in dashed lines the position of the clip after it is installed in the pipe insulation assembly shown in FIG. 1;

FIG. 3 is a vertical cross-sectional view taken along the line 3–3 of FIG. 1; and FIG. 4 is a perspective view, with parts broken away, showing a pipe insulation assembly according to the present invention being installed on a pipe.

DESCRIPTION OF THE PREFERRED EMBODIMENT

A pipe insulation assembly, according to the present invention, is generally indicated in the drawing by the reference number 10. The pipe insulation assembly 10 includes a first semiannular elongated section 11 and a second semiannular elongated section 12. The sections 11 and 12 are formed of, for examples, resin bonded fibrous glass wool, rigid foamed plastic insulation material, or rigid hydrous calcium silicate insulation material. Each of the sections 11 and 12 has a circumferential extent of substantially 180°. When the sections 11 and 12 are placed in a mating or closed position (shown in FIG. 1) their total circumferential extent is 360°.

The sections 11 and 12 have a density of between 6 pounds per cubic foot and 8.5 pounds per cubic foot. The preferred density is between 6.75 pounds per cubic foot and 8.25 pounds per cubic foot.

The first section 11 has a pair of longitudinally extending edges 13 and 14 which lie in the same radial plane. Similarly, the second section 12 has a pair of longitudinally extending edges 15 and 16. When the sections 11 and 12 are moved to the closed position, the adjacent pairs of edges 15–13 and 16–14 are in an abutting relationship.

When the insulation assembly is in the closed position, the sections 11 and 12 define an interior conduit receiving recess 17 and a cylindrical exterior surface 18. The pipe insulation assembly 10 has opposed ends 19 and 20.

Referring to FIG. 2, a C-shaped clip 21, constructed according to the present invention, is shown. The clip 21 is constructed of spring steel wire preferably having a diameter of between 0.025 inch and 0.100 inch. The solid line depiction of the clip 21 shown in FIG. 2 indicates an at-rest or an unrestrained condition while the dashed line position 21a depicts the clip in a restrained or biasing position after installation. At least two of the resilient clips 21 are installed in the pipe insulation assembly 10. In the present embodiment, one of the clips 21 is installed adjacent the end 19 while a second clip 21 is installed adjacent the end 20. The clips 21 extend circumferentially around the sections 11 and 12 more than 180° and less than 360°. Referring to FIG. 3, in the present embodiment, the clips extend around the circumference of the sections 11 and 12 approximately 270°. Preferably, the clips 21 are slightly embedded in the exterior surface 18 of the sections 11 and 12 as shown in FIG. 3. The clips 21 bias the sections 11 and 12 toward the closed position shown in FIG. 1. When the pipe insulation assembly 10 is in the closed position it defines a longitudinally extending central axis indicated by the reference number 22. Preferably the clips 21 lie in planes which are generally perpendicular to the central axis 22 and lie across the mating edges 13–15 but do not cross the edges 14–16.

FIG. 4 shows the pipe insulation 10 during installation on a longitudinally extending pipe 23. A layer of flexible sheet material or jacketing 24 having a sealing lip 25 is at least partially adhered to and surrounds the exterior surface 18 of the sections 11 and 12. The insulation assembly 10 is moved to its open position (shown in FIG. 4) and is placed over the pipe 23. The pipe 23 is received by the recess 17 defined by the two sections 11 and 12. The clips 21 bias the two sections 11 and 12 toward each other and after the assembly 10 reaches its over center position, the clips 21 snap the sections 11 and 12 into the closed position shown in FIG. 1.

After the pipe insulation assembly 10 is in the closed position surrounding the pipe 23, the sealing lip 25 of the flexible sheet material 24 is adhered and the pipe insulation assembly 10 is in its installed position.

While the present invention has been disclosed in connection with a specific arrangement of parts and with respect to a preferred embodiment, it should be expressly understood that numerous modifications and changes may be made without departing from the scope of the appended claims.

I claim:

1. A pipe insulation assembly comprising, in combination, first and second semiannular elongated sections, each of said sections having a circumferential extent of substantially 180° and longitudinally extending edges lying in the same radial plane, said sections being closeable around a pipe to be insulated with their opposed edges in adjacency and providing a cylindrical exterior surface, at least two C-shaped, resilient clips extending circumferentially around said sections more than 180° and lying across only one of the adjacent pairs of edges of said sections, whereby the other one of the adjacent pairs of edges may be opened against the bias of said C-shaped clips to receive the pipe, said C-shaped clips biasing said first and second sections toward the closed position wherein said other one of the adjacent pairs of edges of said sections is urged into a closely abutting relationship and a layer of sheet material at least partially adhered to and surrounding such exterior surface of said sections.

2. A pipe insulation assembly comprising, in combination, first and second semiannular elongated sections, each of said sections being formed of resin bonded fibrous glass wool, each of said sections having a circumferential extent of substantially 180° and longitudinally extending edges lying in the same radial plane, said sections being closeable around a pipe to be insulated with their opposed edges in adjacency and providing a cylindrical exterior surface, at least two C-shaped, resilient clips extending circumferentially around said sections more than 180° and less than 360° and lying across only one of the adjacent pairs of edges of said sections, whereby the other one of the adjacent pairs of edges may be opened against the bias of said C-shaped clips to receive the pipe, said C-shaped clips biasing said first and second sections toward the closed position wherein said other one of the adjacent pairs of edges of said sections is urged into a closely abutting relationship and a layer of flexible sheet material at least partially adhered to and surrounding such exterior surface of said sections.

3. A pipe insulation assembly, according to claim 2, wherein there are two C-shaped clips, each of said clips being positioned adjacent one end of said sections in opposed relationship to the other of said clips.

4. A pipe insulation assembly, according to claim 2, wherein said sections when in the closed position define a longitudinally extending central axis, and wherein said clips lie in planes which are generally perpendicular to such central axis.

5. A pipe insulation assembly, according to claim 2, wherein each of said sections has a density of between 6 pounds per cubic foot and 8.5 pounds per cubic foot.

6. A pipe insulation assembly according to claim 4, wherein each of said resilient clips is at least partially embedded in such exterior surface of said sections.

7. A pipe insulation assembly according to claim 5, wherein each of said resilient clips is constructed of spring steel.

8. A pipe insulation assembly according to claim 7, wherein each of said resilient clips extends circumferentially around said sections approximately 270°

9. A pipe insulation assembly according to claim 7, wherein each of said resilient clips is constructed of a spring steel wire having a diameter between 0.025 inch and 0.100 inch.

10. A pipe insulation assembly comprising, in combination, first and second semiannular elongated sections, each of said sections being formed of bonded fibrous glass wool having a density between 6.75 pounds per cubic foot and 8.25 pounds per cubic foot, each of said sections having a circumferential extent of substantially 180° and longitudinally extending edges lying in the same radial plane, said sections being closeable around a conduit to be insulated with their opposed edges in adjacency and providing a cylindrical exterior surface, said sections having a central longitudinal axis when in the closed position, two arcuate spring steel clips extending partially around the circumference of said sections, said clips lying in planes generally perpendicular to such central axis and lying across only one of the adjacent pairs of edges of said sections, whereby the other one of the adjacent pairs of edges may be opened against the bias of said C-shaped clips to receive the pipe, said clips biasing said first and second sections toward the closed position wherein said other one of the adjacent pairs of edges of said sections is urged into a closely abutting relationship and a layer of flexible sheet material at least partially adhered to and surrounding the exterior surface of said sections.

11. A pipe insulation assembly comprising, in combination, first and second semiannular elongated sections, each of said sections having a circumferential extent of substantially 180° and longitudinally extending edges lying in the same plane, said sections being closeable around a pipe to be insulated with their opposed edges in adjacency and providing a cylindrical exterior surface, and at least two C-shaped resilient clips extending circumferentially around said sections more than 180° and lying across one of the adjacent pairs of edges of said sections, whereby the other one of the adjacent pairs of edges may be opened against the bias of said C-shaped clips to receive the pipe, said C-shaped clips biasing said first and second sections toward the closed position wherein said other one of the adjacent pairs of edges of said sections is urged into a closely abutting relationship.

12. A pipe insulation assembly, according to claim 11, wherein each of said sections comprises rigid hydrous calcium silicate insulation material.

13. A pipe insulation assembly according to claim 11, wherein each of said sections comprises rigid foamed plastic insulation material.

14. A pipe insulation assembly, according to claim 11, wherein each of said sections comprise rigid hydrous calcium silicate insulation material and wherein said clips are embedded in such exterior surface of said pipe insulation assembly.

15. A pipe insulation assembly according to claim 11, wherein each of said sections comprises resin bonded fibrous glass material.